Patented Jan. 30, 1934

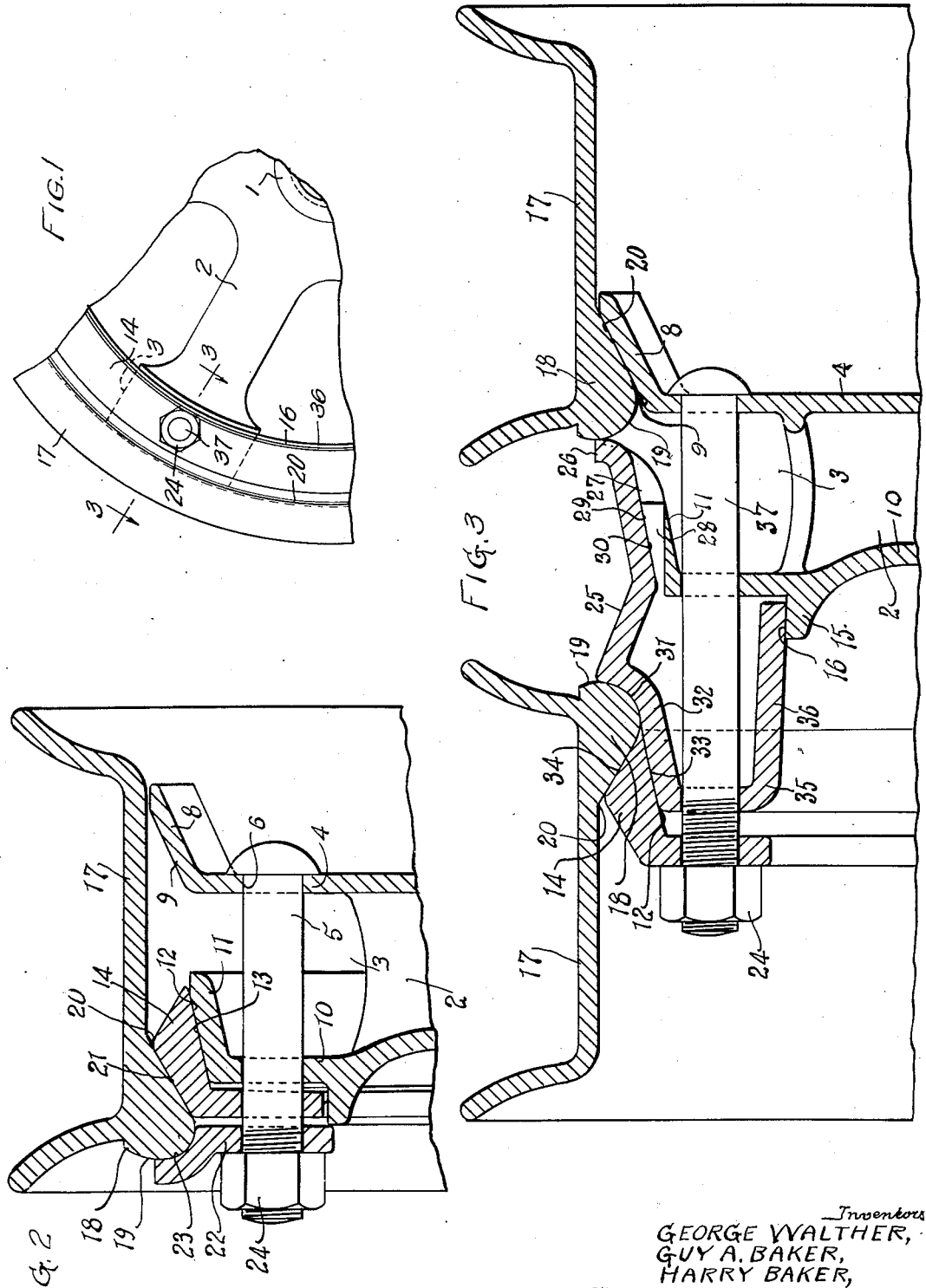

1,945,388

UNITED STATES PATENT OFFICE 1,945,388

INTERCHANGEABLE WHEEL MOUNTING

George Walther, Guy A. Baker, and Harry Baker, Dayton, Ohio, assignors to The Dayton Steel Foundry Company, Dayton, Ohio, a corporation of Ohio Application January 21, 1929. Serial No. 333,780

4 Claims. (Cl. 301—13)

Our invention relates to wheels.

It is the object of our invention to provide a wheel adapted for supporting either a single tire rim or a dual tire rim without modification of the wheel.

It is an object to provide a malleable or steel wheel having a hub and spokes which is adapted to support on the free ends of the spokes either a dual or a single tire rim.

It is an object of my invention to provide a combined spacer and wedge ring for supporting on the free ends of the spokes dual tire rims.

It is a further object to provide means for rigidly locking the rims so that they cannot rattle and will be accurately positioned by such combined wedge and spacer ring construction.

It is a further object to provide a novel form of tire rim which may be readily mounted, positioned and retained upon the spoke ends or upon the felloe by the wedge and spacer ring.

It is a further object to provide inclined wedging and supporting surfaces adjacent the free spoke ends of such angularity as to support the tire rim and wedge ring.

It is a further object of our invention to provide retaining rings with oppositely inclined bevel surfaces adapted to have either of said surfaces engaged, said surfaces being of the same angularity so that one surface can be used for supporting the single tire rim when only one rim is mounted and the other surface can be used for supporting one of the dual rims as well as engaging the felloe ring. Thus, it is possible to use the same rim, ring, clamps and the same spoke end formation for either single or dual pneumatic tires.

Referring to the drawing:

Figure 1 is an elevation showing a part of the outboard side of the assembled wheel with a dual tire rim.

Figure 2 is a section showing one end of a spoke, a section of a single tire rim and a section of the mechanism associated therewith for holding the rim on the spoke.

Figure 3 is a section on the line 3—3 of Figure 1.

Referring to the drawing in detail, 1 refers to a hub and 2 to a spoke. The hub and spokes are preferably manufactured from cast metal iron.

The outer end of each spoke is formed with an end wall 3. An inboard rim wall 4 is provided in which is mounted the retaining bolt 5 through the aperture 6. This bolt has its head 7 resting against the inboard face of the wall 4 of the spoke. The radially outer end of this wall 4 is turned towards the vehicle at an angle to form a supporting shoulder, as at 8. The radially outer diagonally-disposed surface 9 is utilized for a purpose hereinafter described. The outboard side of the wheel is provided with an outboard wall on the spoke end, designated 10. The radially outer end of the wall 10 is also turned towards the vehicle as at 11, the radially outer face of this turned over portion being diagonally disposed as at 12 at such an angle as to receive either the combined felloe and spacer ring hereinafter described or the radially inner surface 13 of the wedging ring 14.

The spoke end is also provided on the outboard side with an axially outwardly extending ledge 15 upon the radially outer surface 16 of which is mounted a portion of the combined felloe and spacer ring.

In the construction shown in Figure 2 only a single tire rim 17 is mounted upon the wheel. This tire rim is provided on one side with a rim shoulder 18 provided with an arcuate outer face 19 and a flat tapered face 20 facing towards the other side of the rim. This face 20 engages with the correspondingly tapered face 21 of the wedging ring 14. The radially outer face 19 is engaged by a supplementary rim lug 22 which has an arcuate face 23 engaging the face 19 and a surface engaged by the nut 24 mounted on the end of the bolt 5 upon which the supplementary rim lug 22 is mounted. The wedging ring is also mounted upon this bolt.

Thus, it will be apparent that both sides of the rim shoulder 18 are engaged and clamped while the weight thereof rests upon the spoke end through the tapered platform 11 upon the face 13.

If it is desired to mount dual rims, two rims like 17 are mounted in the following manner, as shown in Figure 3. The rims are so mounted that their rim shoulders 18 are adjacent to one another.

With this understanding, we first mount upon the supporting shoulder 8 of the spoke the inboard tire rim so that the face 20 of the rim shoulder 18 rests upon the face 9 of the supporting shoulder. We then place in position the combined spacer and felloe ring. This felloe ring consists of an annular body having a spacer ring portion 25 with an inboard shoulder 26 engaging the arcuate face 19 of the inboard rim forcing the rim shoulder thereof against the tapered supporting surface 9 of the supporting shoulder.

We next mount the outboard rim which has its shoulder on the inboard side of the rim so that the arcuate face 19 will engage a similar corresponding arcuate face 31 on the spacer and felloe ring 25. The spacer ring has on its outboard edge a radially inclined ledge 32, the upper surface 33 of which is adapted to engage or be engaged by the inclined surface 12 of the wedge ring 14. The tapered face 34 of this wedging ring 14 is in wedging engagement with the tapered face 20 of the rim shoulder 18. The spacer and felloe ring 25 has a radially inwardly extending portion 35 through which passes the bolt 37. It is also provided with an inboard projecting portion 36 that rests upon the face 16 of the spoke ledge 15. The bolt 37 is similar to the bolt 5 but longer. It passes through both walls 4 and 10 of the spoke, through the vertical portion 35 of the felloe and spacer ring and through the radially inwardly projecting portion of the wedging ring 14. It carries the usual nut 24 which is on the outboard side of the wheel accessible to the person mounting the tire rims.

Thus, it will be seen that the same hub and spokes can be used for supporting either single or dual rims. The same interchangeable clamp and wedging rings 14 can be employed and the same type of bolts with the same type of wheel rims.

The wheel rims and the combined felloe and spacer rings and the wedge rings are of pressed metal or rolled steel formed in the usual manner while the hub and spokes may be formed of cast metal preferably of cheap malleable iron thereby greatly increasing the availability of this wheel for different types of vehicles where cast steel is too heavy or too expensive.

It will be understood that we desire to comprehend within our invention such modifications as may be necessary to adapt it to varying conditions and uses.

Having thus fully described our invention, what we claim as new and desire to secure by Letters Patent, is:

1. A new article of manufacture for use as a clamping and wedging ring interchangeable in single and dual removable rim wheels comprising a laterally extending triangular portion and a radially inwardly disposed bolt-supported portion, said triangular portion having a pair of radially outer gable surfaces adapted to selectively engage a part of one rim and a radially inner tilting surface adapted to engage a rim support, whereby the rim may be supported around the periphery of the wheel or to one side of the wheel.

2. A new article of manufacture for use as a clamping and wedging ring interchangeable in dual and single removable rim wheels comprising a bolt supported radially inwardly extending portion and a wedging portion angularly disposed thereto having oppositely disposed selectively usable angular outer faces and an inner angular face.

3. In combination in a wheel of a hub and free end spokes, a wall extending from the end of each of said spokes having a laterally extending tapered radially outer surface, a wedging ring mounted thereon having a correspondingly tapered radially inner surface and a tapered radially outer surface, a tire rim having a rim shoulder with a radially inner tapered surface engaging the radially outer ring tapered surface, a rim lug adapted to engage the outboard side of said rim shoulder and a bolt passing through the spoke wedging ring and rim lug for clamping said several parts together.

4. In a wheel, a hub, spokes on said hub, said spokes terminating in spaced transversely extending inboard and outboard flanges each adapted to support tire carrying rims in dual arrangement, a removable spacer member mounted on the outboard flange and providing means to support a tire carrying rim having a supporting surface adjacent one edge, means comprising rim lugs to secure said rim to said spacer and to said wheel body whereby the rim overlies the inboard flange and is located centrally of the wheel body, and bolts passing through said rim lugs, spacer member and said spokes.

GEORGE WALTHER.
GUY A. BAKER.
HARRY BAKER.